UNITED STATES PATENT OFFICE 2,316,587

STABILIZED OIL

Sin-Iti Irigai, Tokyo, Japan, assignor to General Electric Company, a corporation of New York No Drawing. Application January 4, 1941, Serial No. 373,161. In Japan February 20, 1940

3 Claims. (Cl. 252—63)

This invention relates to improvements in the stabilization of oils, specifically hydrocarbon oils such, for example, as petroleum hydrocarbon oils and other hydrocarbon oils of mineral origin including oils obtained from oil shale, by the hydrogenation of coal, etc., as well as synthetic hydrocarbon oils comparable in structure and properties to the petroleum hydrocarbon and other natural mineral oils. More specific examples of hydrocarbon oils that may be stabilized in accordance with the present invention are switch oils, transformer oils, cable oils, turbine oils and other viscous and non-viscous electrically insulating and lubricating oils.

Various addition agents heretofore have been added to hydrocarbon oils to inhibit the deterioration of the oil during service use, or have been suggested as being suitable for this purpose, e. g., amines, phenols and quinones and derivatives thereof, organic compounds of sulfur, etc. While many of these compounds have been partly effective in stabilizing the oil and prolonging its useful life, none has been entirely satisfactory. Many of them have only a relatively short inhibiting effect or fail to stabilize the oil sufficiently to be practically useful. Others are difficult to handle in practice because of their objectionable odor or poisonous nature. Still others are themselves readily oxidized and, in oxidized state, have little if any stabilizing effect upon the oil.

The present invention is based on my discovery that a novel class of organic compounds, hereafter more fully identified, constitute very effective addition agents to mineral and other hydrocarbon oils and render the oil highly resistant to deterioration, as by oxidation, during service use.

The stabilizing compounds used in carrying my invention into effect are members of the class of compounds which may be represented by the graphic formula

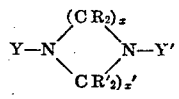

where Y and Y' represent a monovalent organic cyclic radical, more particularly a carbocyclic radical, R and R' represent hydrogen or any monovalent organic radical, and $x$ and $x'$ are integers the sum of which is at least 4 and not more than 7. Thus Y and Y' may be the same or different monovalent organic cyclic radicals such, for example, as cycloaliphatic radicals, aryl (mono and poly) radicals and heterocyclic radicals, etc. More specific examples of cycloaliphatic radicals are cyclopropane, cyclobutane, cyclopentane, cyclohexane, cycloheptane, cyclo-octane, etc., radicals, the alkyl cycloalkane radicals, etc. More specific examples of aryl radicals are alkyl- ated aryl, e. g., alkylated (methylated, ethylated, etc.) phenyl, etc., hydroxylated aryl, e. g., hydroxy phenyl, etc., alkoxy aryl, e. g. alkoxy phenyl, etc., aryloxyaryl, e. g., phenoxyphenyl, etc., naphthyl, alkyl naphthyl (e. g., methyl naphthyl), tetrahydronaphthyl, anthracyl, etc. More specific examples of heterocyclic radicals are furane, furfuryl, pyrryl, etc., radicals. R and R' both may be hydrogen or one may be hydrogen and another a monovalent organic radical or both R and R' may be the same or different monovalent organic radicals. More specific examples of monovalent organic radicals which R and R' may be are alkyl, aryl, aralkyl, alkaryl, acyl, naphthyl, hydrocyclic, heterocyclic, etc., radicals, including derivatives of such radicals as, for instance, aceto, carbalkoxy, acetoxy, etc. Preferably Y and Y' are phenyl radicals and R and R' are hydrogen. A more specific example of a compound of the above-described class is diphenyl piperazine.

The above class of compounds should not be confused with the dialkylene diimines wherein a hydrogen atom is attached to each of two nitrogen atoms in a cyclic nucleus, a typical example being diethylene diimine (also known as piperazine) having the structural formula

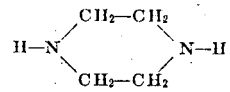

Hydrocarbon oils containing a relatively small amount, e. g., from 0.01 to 1.0 per cent by weight thereof, of diphenyl piperazine and other members of the above-described class are materially improved in their resistance to oxidation, as evidenced by their lesser tendency to form sludge and acid bodies when exposed to air or oxygen. Hence mineral insulating and other hydrocarbon oils containing these new stabilizers have a longer service life than the unmodified oil.

In order that those skilled in the art better may understand how the present invention may be carried into effect, the following illustrative example thereof is given.

EXAMPLE 1

A conventional antioxidant of hydrocarbon oils, specifically 0.1% by weight thereof of phenyl-alpha-naphthylamine, and 0.05% and 0.1%, respectively, of diphenyl piperazine were dissolved in test samples of the same transformer oil to form a homogeneous solution, the resulting oils being designated in the following tables as samples 2, 3 and 4, respectively. Sample 1 contained no antioxidant. Copper wire, the amount of which was the same in all cases, was placed in each sample of oil as an oxidation catalyst. The four samples were heated at 120° C. for a total of 64 hours while bubbling air therethrough (accelerated oxidation test). The acidity of the oil was determined at the end of 24 hours and each 8 hours thereafter until the test was discontinued. This acidity is reported in Table 1 as the milligrams of potassium hydroxide (KOH) required to neutralize 100 grams of the oil.

Table I

|  | Hours heated | | | | | |
|---|---|---|---|---|---|---|
|  | 24 | 32 | 40 | 48 | 56 | 64 |
| Sample 1, no antioxidant | 5.80 | 7.93 | 10.40 | 12.99 | 15.17 | 16.48 |
| Sample 2, 0.1% phenylalpha naphthylamine | 5.35 | 6.49 | 8.00 | 9.76 | 11.20 | 12.20 |
| Sample 3, 0.05% diphenyl piperazine | 4.91 | 4.97 | 5.05 | 5.31 | 5.98 | 6.27 |
| Sample 4, 0.1% diphenyl piperazine | 4.00 | 4.20 | 4.25 | 4.53 | 4.39 | 4.55 |

Next, the quantity of sludge soluble in alkali was measured at the end of the above-described 64-hour accelerated oxidation test. The results were as shown in Table II, the numerical values representing the number of milligrams of alkali-soluble sludge in 100 cubic centimeters of the oil. The sample numbers correspond with those of Table I.

Table II

Sample 1_____ 424.0
Sample 2_____ 363.2
Sample 3_____ 185.2
Sample 4_____ 149.6

From the results shown in Tables I and II it is immediately seen that the addition of 0.05% and 0.1% diphenyl piperazine greatly reduces the tendency of the oil to oxidize, as evidenced by the differences in the amounts of acidity and sludge formed in comparison with the untreated oil. Diphenyl piperazine also is from about 2 to 3 times better as an oxidation inhibitor than phenyl-alpha-naphthylamine.

The results of electrical tests on the oil at the end of the 64-hour test period are shown in Table III. The sample numbers correspond with those of Table I.

Table III

| Sample | Resistivity (Ω—cm.) | | Dielectric strength 20° C., 12.5 mm. sphere, 125 mm. gap |
|---|---|---|---|
|  | 20° C. | 100° C. |  |
| 1 | 5.63×10¹¹ | 2.44×10¹⁰ | 38 |
| 2 | 1.11×10¹² | 3.4×10¹⁰ | 43 |
| 3 | 1.77×10¹² | 7.64×10¹⁰ | 31 |
| 4 | 1.22×10¹² | 5.84×10¹⁰ | 46 |

As shown by the results of the above tests the novel stabilizing agents of this invention, of which diphenyl piperazine

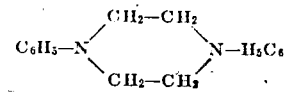

is a typical example, very effectively inhibit the deterioration of hydrocarbon oils, specifically transformer oil, and its effect is of long duration. Furthermore, diphenyl piperazine can be readily handled, as it is an odorless, water-insoluble, crystalline material that does not oxidize or degrade in any way upon exposure to the atmosphere.

The stabilizers of this invention may be prepared by suitably reacting the —NH₂ derivatives of the corresponding organic cyclic compounds with the halogen derivatives of the corresponding (CR₂)$_x$ compounds. For example, diphenyl piperazine readily is synthesized from ethylene bromide and aniline, both of which are comparatively inexpensive raw materials.

The hydrocarbon oils that are stabilized in accordance with the present invention may be so-called "non-viscous" oils having a Saybolt Universal viscosity of less than 100 seconds at 100° F., e. g., from 50 to 90 or 95 seconds at 100° F. Or, they may be the so-called "viscous" oils having a Saybolt Universal viscosity at 100° F. of 100 to 2,000 or more seconds at 100° F., or even as high as 200 or 250 seconds or more at 210° F. The invention is especially applicable to the stabilization of petroleum hydrocarbon oils.

What I claim as new and desire to secure by Letters Patent of the United States is:

1. Petroleum hydrocarbon oil containing a stabilizer therefor comprising a compound having the graphic formula

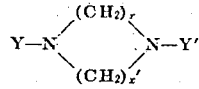

where Y and Y' are phenyl radicals, and $x$ and $x'$ are integers the sum of which is at least 4 and not more than 7.

2. Electrically insulating oil containing a small amount of diphenyl piperazine as a stabilizer of said oil.

3. Petroleum hydrocarbon oil stabilized against oxidation with from 0.01 to 1.0 per cent by weight thereof of diphenyl piperazine.

SIN-ITI IRIGAI.